United States Patent
Karaoguz et al.

(10) Patent No.: US 9,084,173 B2
(45) Date of Patent: *Jul. 14, 2015

(54) NETWORK OR ACCESS POINT HANDOFF BASED UPON HISTORICAL PATHWAY

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/237,615

(22) Filed: Sep. 20, 2011

(65) Prior Publication Data

US 2012/0009899 A1    Jan. 12, 2012

Related U.S. Application Data

(63) Continuation of application No. 11/819,740, filed on Jun. 28, 2007, now Pat. No. 8,023,947, which is a continuation of application No. 10/327,117, filed on Dec. 24, 2002, now Pat. No. 7,254,396.

(60) Provisional application No. 60/409,940, filed on Sep. 12, 2002.

(51) Int. Cl.
*H04W 36/00* (2009.01)
*H04W 36/32* (2009.01)
*H04W 36/08* (2009.01)

(52) U.S. Cl.
CPC ............. *H04W 36/32* (2013.01); *H04W 36/08* (2013.01)

(58) Field of Classification Search
CPC . H04W 36/18; H04W 36/0083; H04W 36/08; H04W 40/00
USPC .................................................. 455/436–444
See application file for complete search history.

(56) References Cited

U.S. PATENT DOCUMENTS

| | | | |
|---|---|---|---|
| 5,799,256 A | 8/1998 | Pombo et al. | 455/574 |
| 5,850,609 A | 12/1998 | Sugarbroad et al. | |
| 6,038,444 A * | 3/2000 | Schipper et al. | 455/421 |
| 6,366,781 B1 | 4/2002 | Hussain et al. | |
| 6,522,888 B1 * | 2/2003 | Garceran et al. | 455/456.3 |
| 6,571,221 B1 * | 5/2003 | Stewart et al. | 705/52 |
| 7,009,952 B1 | 3/2006 | Razavilar et al. | |
| 7,254,396 B2 | 8/2007 | Karaoguz et al. | |

(Continued)

OTHER PUBLICATIONS

"IEEE 802.11, A Technical Overview," Pablo Brenner, BreezeNet website, Jul. 8, 1997, www.sss-mag.com/pdf/80211p.pdf.

(Continued)

*Primary Examiner* — Kwasi Karikari
*Assistant Examiner* — Edward Zhang
(74) *Attorney, Agent, or Firm* — Brinks Gilson & Lione

(57) ABSTRACT

A device for handing off a wireless connection can include a receiver configured to receive a communication signal from a wireless device within a first wireless cell, a first processor configured to determine communication information regarding the first wireless cell, and a storage unit configured to store directional information regarding the first wireless cell. In addition, the device can have a transmitter configured to transmit the directional information to a wireless device located within the first wireless cell, and a second processor configured to provide wireless connection to the wireless device through the receiver and the transmitter. The second processor can Handoff the wireless connection to a second wireless cell.

20 Claims, 3 Drawing Sheets

(56) References Cited

U.S. PATENT DOCUMENTS

| | | | |
|---|---|---|---|
| 8,023,947 | B2 | 9/2011 | Karaoguz et al. |
| 2001/0055988 | A1 | 12/2001 | Blake et al. |
| 2002/0055333 | A1 | 5/2002 | Davies et al. |
| 2002/0098843 | A1 | 7/2002 | Struhsaker |
| 2002/0133534 | A1* | 9/2002 | Forslow .................. 709/200 |
| 2002/0147031 | A1* | 10/2002 | Hood, III ................ 455/562 |
| 2002/0176579 | A1 | 11/2002 | Deshpande et al. |
| 2003/0013146 | A1* | 1/2003 | Werb ......................... 435/9 |
| 2003/0050064 | A1 | 3/2003 | Davies et al. |
| 2003/0069043 | A1* | 4/2003 | Chhaochharia et al. ...... 455/561 |
| 2003/0119527 | A1 | 6/2003 | Labun et al. |
| 2003/0139140 | A1 | 7/2003 | Chen et al. |
| 2004/0192310 | A1 | 9/2004 | Karaoguz et al. |
| 2004/0203863 | A1 | 10/2004 | Huomo |
| 2004/0266457 | A1 | 12/2004 | Dupray |
| 2005/0089011 | A1 | 4/2005 | Bender |
| 2005/0159164 | A1 | 7/2005 | Leedom, Jr. |
| 2006/0271216 | A1* | 11/2006 | Shim et al. ................ 700/95 |
| 2007/0254668 | A1 | 11/2007 | Karaoguz et al. |

OTHER PUBLICATIONS

Donny Jackson, Telephony, Ultrawideband May Thwart 802.11, Bluetooth Efforts, Primedia Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert 1. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.

Dr. Terence W. Barrett, "History of Ultra Wide band (UWB) Radar & Communications: Pioneers and Innovators," Proceedings and Progress in Electromagnetics Symposium 2000 (PIERS2000), Cambridge, MA, Jul. 2000.

Dr. Henning F. Harmuth, "An Early History of Non sinusoidal Electromagnetic Technologies," Multispectral.com, Multispectral Solutions, Inc., www.multispectral.com/history.html, Aug. 20, 2002.

Rebecca Taylor, "Hello, 802.11b AND Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies,"I0Meters.com, www.I0meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.IIb Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11 b—Part 1, www.wilcoxonwireless.com/whitepapers/bluetoothvs802.doc, Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for 8/1912002 through Aug. 11, 2002, 80211b.weblogger.com/, Aug. 11-19, 2002.

"Wireless Ethernet Networking with S02.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHe1p.com, Anomaly, Inc., www.homenetheIQ.comlweb/diagramlaccess-Qoint.asQ, Aug. 20, 2002.

"Simple 802.11 b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"'Wireless Access Point (802.11b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven 1. Vaughan-Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse-Link, Inc., www.pulselink.net/ov_history.html, Sep. 4, 2002.

Robert X. Cringely, "The 100 Mile-Per-Gallon Carburetor—How Ultra Wide Band May (or May Not) Change the World," InterestingPeople.org, Jan. 26, 2002.

William A. Kissick, Editor, "The Temporal and Spectral Characteristics of Ultrawide band Signals," NTIA Report 01-383, Jan. 2001, www.its.bldrdoc.gov/pub/ntia-rpt/0I-383/.

"Ultra Wide Band," www.ida.gov.sg/Website/IDAContent.nsf/dd1521f1e79ecf3bc825682f0045a349/1856626048baf403c82569880267e26%3FOpenDocument+%22Full+duplex+UWB +handheldtransceiver%22&hl=en&ie=UTF-8, Aug. 20, 2002.

* cited by examiner

NETWORK OR ACCESS POINT HANDOFF BASED UPON HISTORICAL PATHWAY

CROSS-REFERENCE TO RELATED APPLICATIONS/INCORPORATION BY REFERENCE

The present application is a CONTINUATION of U.S. application Ser. No. 11/819,740, filed Jun. 28, 2007, now issued U.S. Pat. No. 8,023,947, which is a CONTINUATION of U.S. application Ser. No. 10/327,117, filed Dec. 24, 2002, now issued U.S. Pat. No. 7,254,396. Said U.S. application Ser. No. 10/327,117 claims benefit from and priority to U.S. Application No. 60/409,940, filed Sep. 12, 2002. The above-identified applications are hereby incorporated herein by reference in their entirety.

BACKGROUND OF THE INVENTION

1. Field of the Invention

The present invention relates to a method of and an apparatus for performing network or access point handoff based upon historical pathway, within a wireless communication network environment such as IEEE 802.11, BLUETOOTH™, Ultra-Wideband (UWB) or any other wireless environment. In particular, the present invention relates to a method of and a system of using historical pathway information to handoff wireless connection from one network to another or from one access point to another. The present invention can be implemented in a wireless network device, which may include discrete devices or which may be implemented on a semiconductor substrate such as a silicon chip.

2. Description of the Related Art

Currently, cables and wires are predominantly used as the communication medium for transferring information such as voice, video, data, etc. from one source to another. For example, cables or wires are commonly used to set up networking infrastructures in business offices, and are also used for personal home computing, and for connecting to the Internet. Therefore, cables and wires are generally used to configure a wired network wherein the cables and wires physically connect one or more device(s) to the wired network. Given the stationary nature of the wired devices, the devices can establish communication sessions with one or more other devices that are also physically connected to the network without concerns of communication coverage or drop-off.

On the other hand, as wireless technology continues to advance and grow, the usage and the popularity of wireless devices will also increase and grow. Therefore, there may be an increase in wireless cell networks for providing connection of wireless services therein. Since wireless devices can move from one geographic location to another, it may be important to provide wireless connection as the wireless devices move from one wireless cell to anther wireless cell.

SUMMARY OF THE INVENTION

One example of the present invention can be a method of handing off a wireless connection. The method can include the steps of establishing a wireless connection with a wireless device within a first wireless cell, determining communication information with regard to the first wireless cell, and providing wireless connection to the wireless device within the first wireless cell. In addition, the method can include the steps of transmitting directional information to the wireless device, and handing off the wireless connection to a second wireless cell.

In another example, the present invention can relate to a device for handing off a wireless connection. The device can have a receiver configured to receive a communication signal from a wireless device within a first wireless cell, a first processor configured to determine communication information regarding the first wireless cell, and a storage unit configured to store directional information regarding the first wireless cell. Moreover, the device can have a transmitter configured to transmit the directional information to a wireless device located within the first wireless cell, and a second processor configured to provide wireless connection to the wireless device through the receiver and the transmitter. The second processor can Handoff the wireless connection to a second wireless cell.

Additionally, another example of the present invention can provide a system for handing off a wireless connection. The system can include an establishing means for establishing a wireless connection with a wireless device within a first wireless cell, a determining means for determining communication information with regard to the first wireless cell, and a providing means for providing wireless connection to the wireless device within the first wireless cell. Furthermore, the system can have a transmitting means for transmitting directional information to the wireless device, and a hand-off means for handing off the wireless connection to a second wireless cell.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
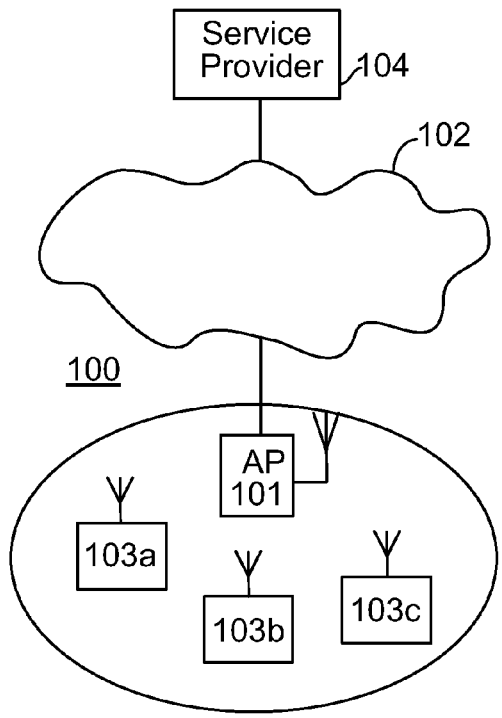
FIG. 1 illustrates one example of a wireless network.

FIG. 1 illustrates one example of a wireless network. FIG. 1 provides a wireless infrastructure network 100 containing an Access Point 101 connected with a LAN 102, such as an Ethernet LAN. In addition, the wireless infrastructure network 100 can contain devices 103a, 103b, 103c. The Access Point 101 is connected to the LAN 102 by wires or cables and can be formed as part of the wired network infrastructure 102, having at least one service provider 104. The service provider 104 can include one or more server(s) connected to the LAN 102. One function of the Access Point 101 can be a bridge or a connection between the wireless network 100 and the wired network 102. Accordingly, all communications between the devices 103a, 103b, 103c or between the devices and the wired network 102 can go through Access Point 101.

The examples of wireless networks as illustrated in FIG. 1 can use wireless technologies such as IEEE 802.11, BLUETOOTH™, UWB, etc.

Figure 2:
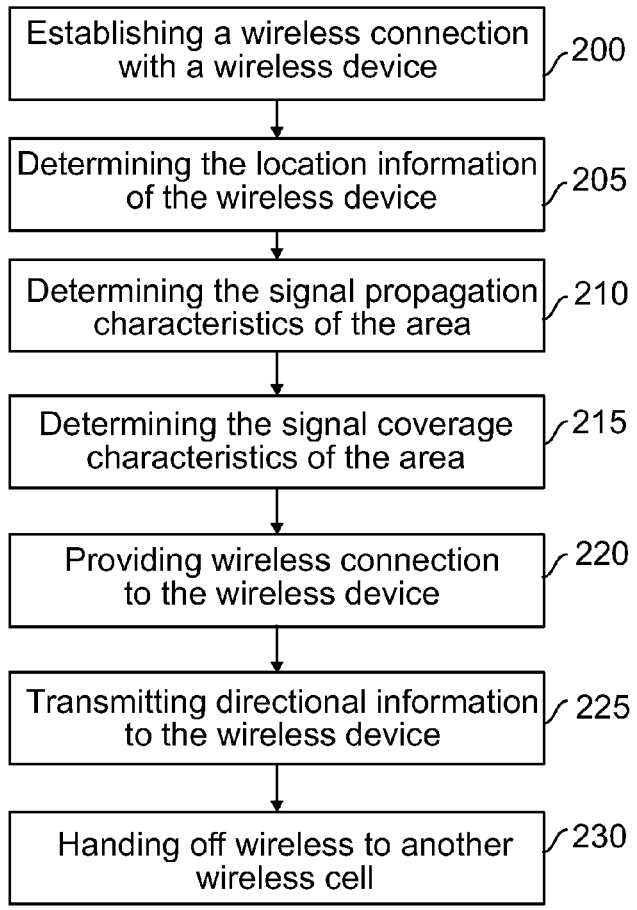
FIG. 2 illustrates a flow chart illustrating one example of a method of performing network or access point handoff based on historical pathway, according to the present invention.

FIG. 2 illustrates one example of a method of performing network or access point handoff based on historical pathway, in accordance with the present invention. Specifically, FIG. 2 illustrates one example of a method of efficiently handing off a wireless connection from one access point to another access point, or from one network to another network using the historical pathways of a wireless device. The method of the present example can be implemented in hardware, or software, or a combination of both hardware and software.

As mentioned above, as wireless technology continues to advance and grow, the usage and the popularity of wireless devices will also increase. Similarly, as wireless service providers offer more and convenient ways to access resources such as the Internet, the number of wireless cell providing connection for network customers or users will increase. Since wireless technology can allow the wireless devices to move from one wireless cell to another wireless cell, efficient handoff of wireless connection using historical pathway can be implemented to minimize or eliminate a drop in the coverage. Therefore, FIG. 2 illustrates one example of performing network or access point handoff based on historical pathway. It is noted that any reference to the phrase "wireless cell" herein can also include the term "wireless communication zone."

A user having a wireless device can enter a geographic area having a wireless network infrastructure, which can include a plurality of wireless cells therein. Each wireless cell can provide wireless connection, and each wireless cell can be configured similar to the wireless cell network 100 as shown in FIG. 1.

Each wireless cell can contain a handoff device, which can perform as an access point for the wireless cell. The handoff device can be connected to a wired LAN having a server. The wired LAN can be an Ethernet LAN wherein the Ethernet LAN includes one or more service provider(s). The user within a first wireless cell either can send a request message from the wireless device to the handoff device, or has already established wireless connection within the first wireless cell. The request message can be a request to perform a specified task such as accessing resources or accessing services provided by or through the first wireless cell. The request message can include information such as the type of the wireless device, the data rate capacity of the wireless device, etc. In addition, the request message can be a request to perform a specified task wherein the request message can include information such as the type of task, the preferable data rate to achieve, the source and destination information, the priority of the task, etc. The handoff device can receive the request message from the user and can establish a wireless connection with the user at step 200 of FIG. 2.

After the handoff device receives the request message, the handoff device can initiate a signal-generating location information feature within the handoff device to determine the location information of the user who sent the request message at step 205. The handoff device can determine the location information such as the distance range location information or the geographic location information of the customer in various ways.

In one example, the handoff device can start by transmitting signals such as UWB signals within a predetermined default distance range at a corresponding power output level to locate the user's wireless device as well as other wireless devices within the wireless cell network. The handoff device can transmit UWB signals in unidirectional mode or omni-directional mode. In addition, the handoff device can transmit signals in pulses with short duty cycles.

After the transmission of signals either uni-directionally or omni-directionally, the transmitted signals can come into contact with the user's wireless device, and thereafter the signals can reflect back to the handoff device where the reflected signals can be received by the receiver within the handoff device.

Thereafter, the handoff device can monitor and register the timing of the transmission of the signals as well as the timing of the propagation of the signals. For example, the handoff device can monitor and record the time each signal is transmitted. Once the transmitted signals are reflected back and received by the receiver, the handoff device can monitor and record the time each signal is received. Based on this information, the handoff device can measure the total time duration for a signal to travel from the transmitter of the handoff device to the user's wireless device, and to reflect back and received by the receiver.

Based on this information and other factors, such as propagation delay, obstructions, the direction and angle of the signal transmission, the speed at which the signal travels compared to the speed at which light travels, etc., the handoff device can process the information in a location information processor to determine the distance range of the user's wireless device within the wireless cell network.

In another example, the handoff device can start by transmitting a range message signal to the user's wireless device within the wireless cell network. The range message signal can be sent out from a transmitter within the handoff device. In addition, the range message signals can be UWB signals transmitted in short duty cycles at a starting time T, such as T=0. Similar to the example above, the transmission of the range message signals can be unidirectional or omni-directional.

After sending the range message signals to the user's wireless device, the use's wireless device can receive the range message signal at a time T1. T1 for example, can be the sum of time T, the time of the processing delay $\Delta P$, and the time of the first propagation delay $\Delta T_1$. Thus, the user's wireless device can receive the range message signal at time T1, and can be represented as follows:

$$T1 = T + \Delta P + \Delta T_1$$

Once the user's wireless device receives the range message signals, the user's wireless device can process the received range message signal. The user's wireless device can determine whether or not to further establish communication with the handoff device, and abort the request. In the alternative, the user's wireless device can automatically respond and can send a range message acknowledgement signal to the handoff device. The range message acknowledgement signal can contain various information about the available device, such as the user's user ID, personal password, cryptography protocol, etc. The user's wireless device can send the range message acknowledgement signal at time T2. T2 for example, can be the sum of time T, the time of the processing delay $\Delta P$, the time of the first propagation delay $\Delta T_1$, and the turn-around time $\Delta TA$. The turn-around time $\Delta TA$ can represent the period of time from the time the user's wireless device receives the range message signal to the time the user's wireless device transmits the range message acknowledgement signal. Accordingly, time T2 can be represented as the following equation.

$$T2 = T + \Delta P + \Delta T_1 + \Delta TA$$

At time T2, a range message acknowledgement signal can be sent from the user's wireless device to the handoff device. After the range message acknowledgement signal reaches the handoff device, the range message acknowledgement signal can be received by the receiver. Once the range message acknowledgment signal is received, the handoff device can thereby determine a total time $T_{Total}$. The total time $T_{Total}$ can be the sum of time T2 and the second propagation time delay $\Delta T_2$. Accordingly, the total time $T_{Total}$ can be represented by the following equation.

$$T_{Total} = T2 + \Delta T_2$$

Based on the total time $T_{Total}$, the information embedded within the range message acknowledgement signal, and other factors such as device related delays, the handoff device can determine the distance range of the user's wireless device.

In yet another example, the handoff device can determine the geographic position of the user's wireless device. The handoff device can start by determining the surrounding environment in relation to itself. This information can be already stored within the handoff device if the handoff device remains relatively stationary, or the handoff device can determine the geographic area surrounding itself through a geographic position unit or other positioning systems such as a Global Positioning System.

Next, the handoff device of the present example can determine it's own position in relation to the immediate surrounding environment. Again, this information can be already stored within the handoff device if the handoff device remains relatively stationary. For example, the handoff device can access data regarding the interior design or interior layout of the immediate environment instantly from a storage unit. In the alternative, the handoff device can transmit initial detecting pulse signals to detect the interior design or interior layout of the surrounding area.

After determining the immediate surrounding geographic area in relation to its own position, the handoff device can determine the distance range of the user's wireless devices by way of the examples mentioned above. The steps of determining the distance range can include the steps transmitting signals within the surrounding environment, receiving one or more second signal(s), and measuring the total propagation time, etc.

Once the handoff device has determined the distance range of the user's wireless device in relation to its own position, the handoff device can thereafter determine the coordinates of the user's wireless device based on information such as the distance range information, the surrounding geographic environment information, the global geographic positioning information, etc. The coordinates of the user's wireless device can in part determine the geographic position of user's location.

It is noted that although the examples provided above can determine the distance range location information and/or the geographic position location information of a single wireless device, the present invention can determine the location information of a plurality of wireless devices within a wireless cell network. It is further noted that the location information of each wireless device can assist in the determination of the signal propagation characteristics of each wireless device.

Following the determination of the location information of the user's wireless device, the handoff device can determine the signal propagation characteristics of the area within the first wireless cell at step 210. The signal propagation characteristics can already be stored within the handoff device or can be determined during initiation or during network registration. At the same time, the handoff device can determine signal coverage characteristics regarding the first wireless cell at step 215. Similar to the signal propagation characteristics, the signal coverage characteristics can already be stored within the handoff device or can be determined during initiation or during network registration.

Once the communication information such as the location information of the wireless device, the signal propagation characteristics, and the coverage characteristics are determined, the handoff device can initiate and provide wireless connection to the wireless device within the first wireless cell at step 220.

After wireless connection is provided to the wireless device within the first wireless cell, the handoff device can access directional information and can transmit the direction information to the wireless device at step 225 of FIG. 2. The directional information can be based on historical pathway(s) stored in a storage unit within the handoff device. Furthermore, the historical pathway(s) information can either be preprogrammed within the handoff device or can be determined over a period of time through previous wireless connections and historical handoffs within the wireless cell.

Accordingly, the wireless device can receive a set of navigational directions which can instruct the user on the optimal way to move through a particular geographic area. The navigational instructions can be displayed using a topographical map or other various ways.

Once the wireless device receives the navigational directions, the wireless device can move through the geographic area having wireless connection provided by the first wireless cell. When the wireless device reaches an area where a second and/or third wireless cell coverage is available, the handoff device within the first wireless cell can coordinate with the other handoff devices within the second and/or third wireless cell for an efficient wireless connection handoff at step 230. The handoff device within the first wireless cell can base the handoff of the wireless connection to another handoff device on the historical pathway taken by the wireless device.

Figure 3:
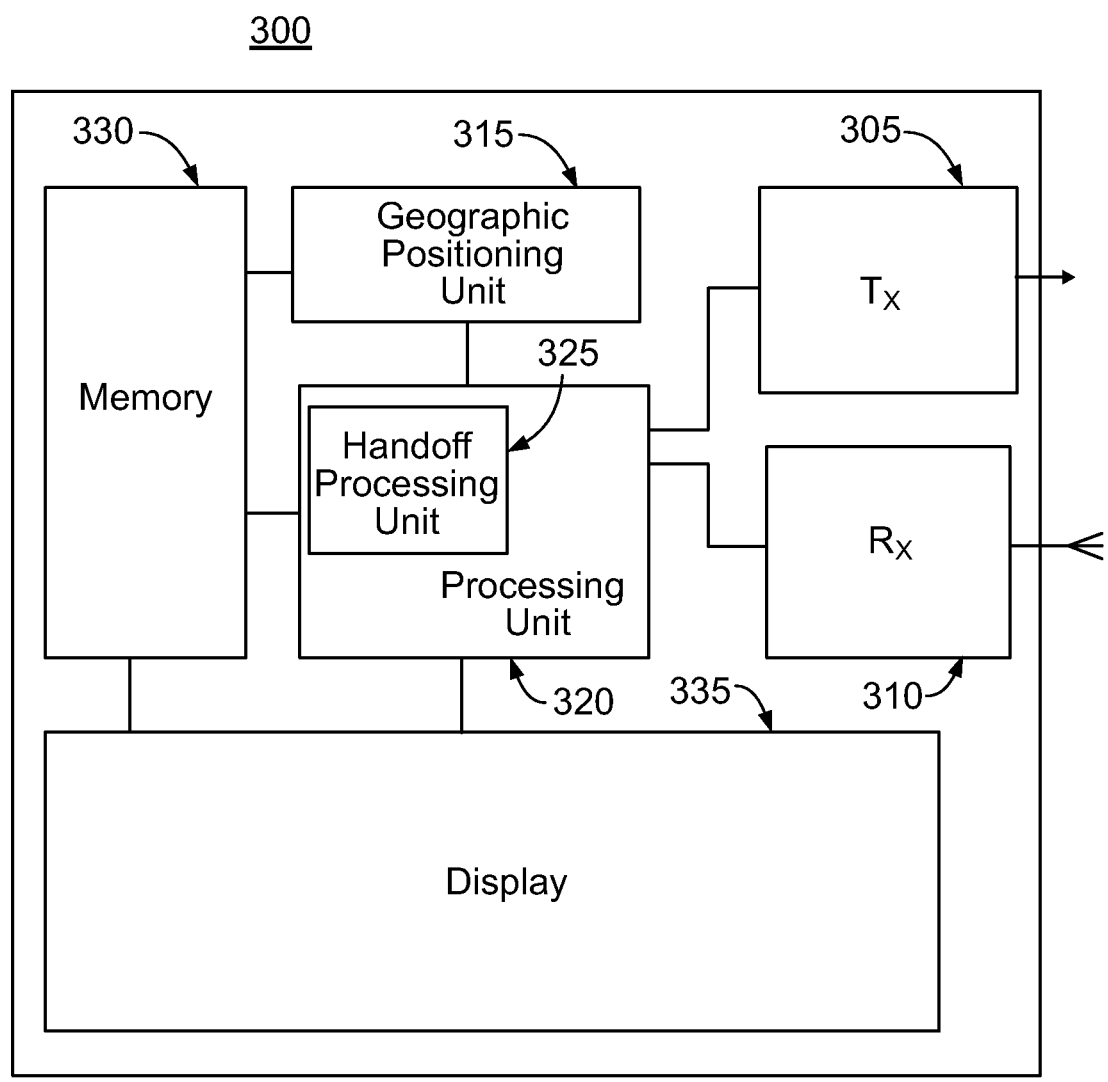
FIG. 3 illustrates one example of a hardware configuration for handing off a wireless connection from one network to another network or from one access point to another access point based on historical pathway, according to the present invention.

FIG. 3 illustrates one example of a hardware configuration that can perform network or access point handoff based on historical pathway, in accordance with the present invention. In addition, the hardware configuration of FIG. 3 can be in an integrated, modular and single chip solution, and therefore can be embodied on a semiconductor substrate, such as silicon. Alternatively, the hardware configuration of FIG. 3 can be a plurality of discrete components on a circuit board. The handoff can also be implemented as a general purpose device configured to implement the invention with software.

FIG. 3 illustrates a handoff device 300 configured to handoff wireless connection from one network to another network or from one access point to another access point. The handoff device 300 contains a receiver 310 and a transmitter 305. The transmitter 305 can transmit electro-magnetic signals as well as various other signals including UWB signals. The transmitter 305 can transmit signals in short pulses in short duty cycles. Therefore, the transmitter 305 can transmit signals such as directional information to a wireless device. In the alternative, the receiver 405 can receive electro-magnetic signals as well as various other signals including UWB signals.

Furthermore, the handoff device 400 can include a geographic positioning unit 315 and a memory 330. The geographic positioning unit 315 can store geographic positioning information and interior floor plan information for a specific geographic area. Furthermore, the memory 330 can store information such as geographic maps, device capability information, signal propagation characteristics, signal coverage characteristics, historical pathway(s) or can store default values and look-up table, etc.

FIG. 3 also shows a processing unit 320, and a handoff processing unit 325 for determining and performing efficient handoff from one handoff device to another handoff device. It is noted that the handoff processing unit 325 can be a separate processing unit. It is further noted that although the handoff processing unit 325 is shown to be within the processing unit 320, the handoff processing unit 325 can be a separate and distinct processing unit from the processing unit 320.

Therefore, the processing unit 320 can be the main processing unit and can process functions that are outside the functions of the handoff processing unit 325. The handoff processing unit 325 can therefore perform all the functions and tasks related to the efficient handoff of wireless connection from a first wireless cell to another wireless cell.

Furthermore, FIG. 3 includes a display 335. The display 335 can be a plasma display, a LCD display or various other types of display for displaying multimedia information.

Figure 4:
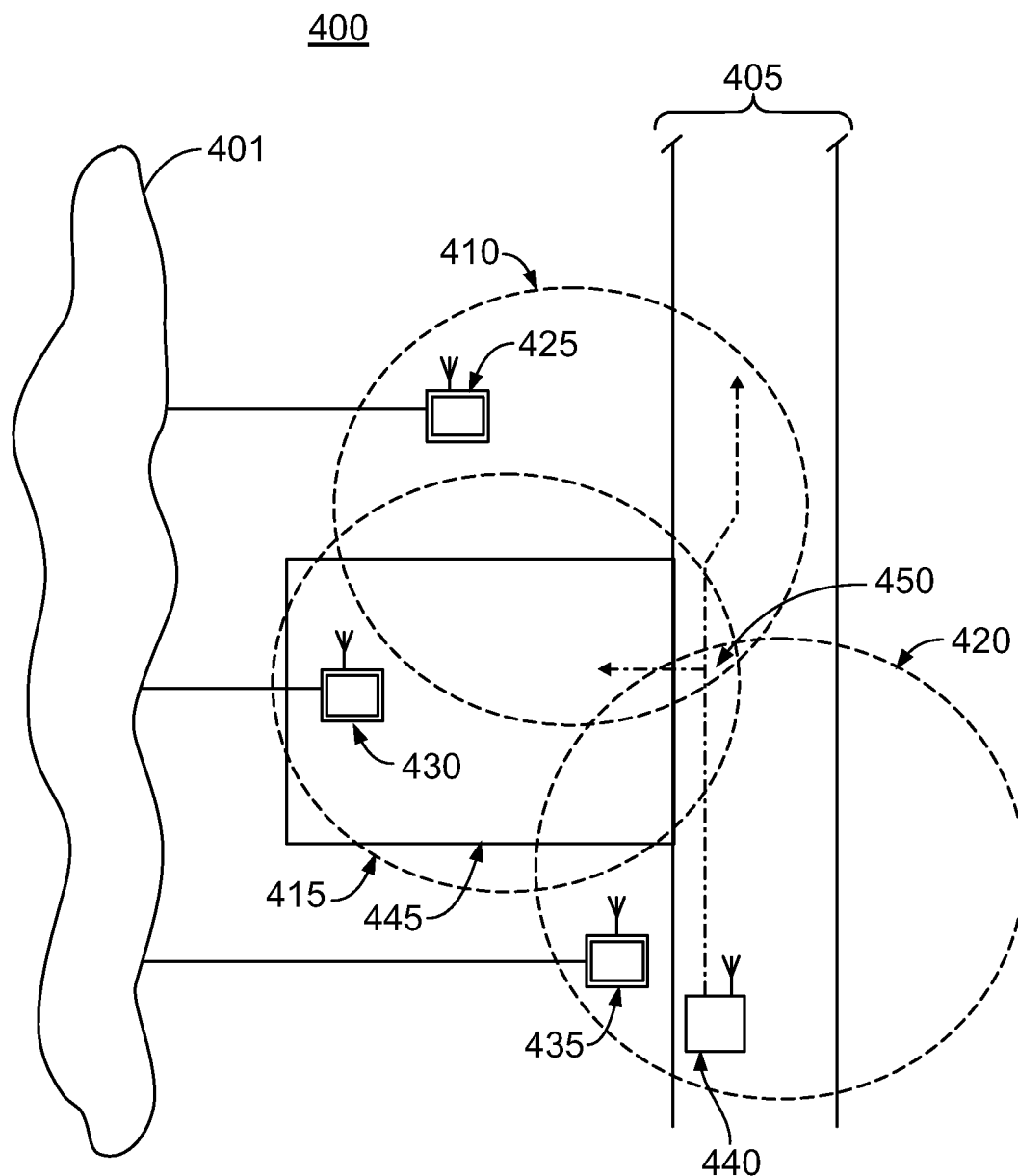
FIG. 4 illustrates one embodiment of network or access point handoff based on historical pathway, according to the present invention.

FIG. 4 illustrates one example of the present invention and can be embodied in an environment such as an office environment. FIG. 4 shows a geographic area of an office space having a wireless network infrastructure 400. The wireless network infrastructure 400 has three wireless cells 410, 415, and 420. Each wireless cell includes a handoff device 425, 430 and 435. The handoff devices 425, 430 and 435 can perform the functions of an access point as discusses above with respect to FIG. 1. Each handoff device is connected to a wired LAN 401.

The office environment of the present example has a walkway 405, and wireless coverage for the walkway shown in FIG. 4 is provided by wireless cells 410, 415 and 420.

In this example, a wireless device 440 enters the walkway 405 and either can send a request message from the wireless device to the handoff device 435, or has already established wireless connection within the first wireless cell 420. Suppose for this example a request message is sent by the wireless device 440 to the handoff device 435. The request message can be a request to perform a specified task such as accessing resources or accessing services provided by or through the first wireless cell 420. The handoff device 435 can receive the request message from the wireless device 440 and can establish a wireless connection with the wireless device 440.

After the handoff device 435 receives the request message, the handoff device 435 can initiate a signal-generating location information feature within the handoff device to determine the location information of the wireless device 440. The handoff device 435 can determine the location information such as the distance range location information or the geographic location information of the wireless device 440 as the wireless device moves through the walkway 405.

Following the determination of the location information of the wireless device 440, the handoff device 435 can determine the signal propagation characteristics of walkway 405 within the wireless cell 420. The signal propagation characteristics can already be stored within the handoff device or can be determined during initiation or during network registration. At the same time, the handoff device 435 can determine signal coverage characteristics regarding the walkway 405 within the wireless cell 420. Similar to the signal propagation characteristics, the signal coverage characteristics can already be stored within the handoff device or can be determined during initiation or during network registration.

Once the communication information such as the location information of the wireless device, the signal propagation characteristics, and the coverage characteristics are determined, the handoff device 435 can initiate and provide wireless connection to the wireless device within the wireless cell 420.

After wireless connection is provided to the wireless device within the wireless cell 420, the handoff device 435 can access directional information and can transmit the direction information to the wireless device 440. The directional information can be based on historical pathway(s) stored in a storage unit within the handoff device 435. Furthermore, the historical pathway(s) information can either be preprogrammed within the handoff device 435 or can be determined over a period of time through previous wireless connections and historical handoffs within the wireless cell.

Accordingly, the wireless device 440 can receive a set of navigational directions which can instruct the wireless device 440 on the optimal way to move through a particular geographic area. In this example, the navigational directions based on historical pathway(s) instruct the wireless device 440 to traverse through the walkway 405 staying on the left side of the walkway 405 for the optimal and efficient coverage.

Once the wireless device 440 receives the navigational directions, the wireless device 440 can move through the walkway 405 by staying on the left side of the walkway 405. When the wireless device reaches an area 450 where a second wireless cell coverage 415 and a third wireless cell coverage 410 are also available, the handoff device 435 within the first wireless cell 435 can coordinate with the other handoff devices 430 and 425 for an efficient wireless connection handoff. The handoff device 435 within the first wireless cell 420 can handoff the wireless connection to the handoff device 425 within the third wireless cell 410, or to the handoff device 430 within the second wireless cell 415, based on the historical pathway(s).

In this example, if the wireless device 440 was to take a left and go into the area 445, then the handoff device 435 would handoff the wireless cell connection to handoff device 430. However, if the wireless device 440 was to go through the walkway 405 without entering the area 445, then the handoff device 435 would handoff the wireless connection to handoff device 425 without handing off the wireless connection to handoff device 430. Therefore, as wireless device 440 moves through the walkway 405, the handoff device 435 would first provide wireless connection to the wireless device 440 within the first wireless cell 420. When the wireless device 440 reaches area 450 where wireless connection is provided by all three cells 410, 415, and 420, the handoff devices 425, 430, and 435 coordinates with each other and based in part on the historical pathway(s), the handoff device 435 can determine to handoff the wireless connection to handoff device 425 if the wireless device 440 moves through the walkway 405, or the handoff device 435 can determine to handoff the wireless connection to handoff device 430 if the wireless device 440 moves into area 445.

One having ordinary skill in the art will readily understand that the invention as discussed above may be practiced with steps in a different order, and/or with hardware elements in handoffs which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What we claim is:

1. A wireless access point comprising:
    a receiver configured to receive communication signals from one or more wireless communication devices;
    a geographic positioning unit in data communication with the receiver and configured to store geographic positioning information for one or more wireless communication devices and interior floor plan information for a specific geographic area; a handoff processing unit in data communication with the receiver and the geographic positioning unit, the handoff processing unit configured to determine directional information for respective wireless communication devices of the one or more wireless communication devices to guide the respective wireless communication devices on respective paths through the specific geographic area and to hand off communication from the wireless access point to another wireless access point; and a transmitter in data communication with the handoff processing unit and configured to communicate data including the directional information to the respective wireless communication devices.

2. The wireless access point of claim 1 wherein the handoff processing unit is configured to determine the directional information using data defining historical pathways previously traversed by one or more respective wireless communication devices of the one or more wireless communication devices.

3. The wireless access point of claim 2 wherein the handoff processing unit is configured to determine the directional information using previously stored data defining the historical pathways.

4. The wireless access point of claim 2 wherein the handoff processing unit is configured to determine the directional information using received data defining locations and handoff operations by one or more respective wireless communication devices over a time period.

5. The wireless access point of claim 1 wherein the geographic positioning unit configured to cooperate with the receiver and the transmitter to obtain the geographic positioning information for the respective wireless communication devices.

6. The wireless access point of claim 5 wherein the geographic positioning unit is configured to:
  determine location information for each respective wireless communication device as the each respective wireless communication device moves through the specific geographic area,
  determine signal propagation characteristics of the specific geographic area; and
  determine signal coverage characteristics of the specific geographic area.

7. The wireless access point of claim 6 wherein the handoff processing unit is configured to use the location information for the respective wireless communication devices, the signal propagation characteristics and the signal coverage characteristics of the specific geographic area from the geographic positioning unit to determine the directional information for the respective wireless communication devices.

8. The wireless access point of claim 6 wherein the geographic positioning unit is configured to retrieve data defining the signal propagation characteristics and the signal coverage characteristics of the specific geographic area from storage.

9. The wireless access point of claim 6 wherein the handoff processing unit is configured to use the location information for the respective wireless communication devices to identify other respective wireless access points to hand off communication with the respective wireless communication devices from the wireless access point.

10. A method comprising:
  in a handoff device of a wireless communication network, establishing wireless communication with a wireless communication device in a specific geographic area which is served in part by the handoff device;
  determining communication characteristics of the specific geographic area;
  determining location information of the wireless communication device in the specific geographic area;
  comparing the location information of the wireless communication device with the communication characteristics of the specific geographic area;
  based on the comparison, identifying a preferred path through the specific geographic area for the wireless communication device;
  based on the comparison, identifying one or more other handoff devices for handing off communication with the wireless communication device; and
  transmitting to the wireless communication devices a set of navigation instructions based on the preferred path and the identified one or more other handoff device, the set of navigation instructions defining an optimal path through the specific geographic area and the identified one or more other handoff devices for subsequent handoff by the handoff device.

11. The method of claim 10 wherein determining location information of the wireless communication device in the specific geographic area comprises:
  transmitting signals from the handoff device;
  receiving signals at the handoff device; and
  determining from the received signals the location information of the wireless communication device.

12. The method of claim 11 wherein transmitting signals from the handoff device comprises transmitting locating signals into the specific geographic area and wherein receiving signals at the handoff device comprises receiving reflected locating signals from the wireless communication device and wherein determining the location information of the wireless communication device comprises determining a distance range of the wireless communication device.

13. The method of claim 11 wherein transmitting signals from the handoff device comprises transmitting a range message signal to the wireless communication device and wherein receiving signals at the handoff device comprises receiving a range message acknowledgement signal from the wireless communication device and wherein determining the location information of the wireless communication device comprises determining a distance range of the wireless communication device using the range message acknowledgement signal.

14. The method of claim 10 wherein determining communication characteristics of the specific geographic area comprises:
  determining signal propagation characteristics of the specific geographic area;
  determining signal coverage characteristics of the specific geographic area;
  determining surrounding geographic environment of the specific geographic area, and wherein determining location information of the wireless communication device in the specific geographic area comprises using the signal propagation characteristics, the signal coverage characteristics of the specific geographic area and the surrounding geographic environment of the specific geographic area to determine location coordinates in the specific geographic area of the wireless communication device.

15. The method of claim 14 wherein determining signal propagation characteristics and determining signal coverage characteristics of the specific geographic area comprise retrieving stored data from memory, the stored data defining the signal propagation characteristics and the signal propagation characteristics.

16. The method of claim 10 wherein identifying a preferred path through the specific geographic area for the wireless communication device comprises accessing data defining historical pathways through the specific geographic area taken by other wireless communication devices travelling through the specific geographic area.

17. The method of claim 16 wherein accessing data defining historical pathways comprises retrieving data that has been determined over a period of time through previous wireless connections with other wireless communication devices and through historical handoffs by the other wireless communication devices to other handoff devices.

18. The method of claim 16 wherein accessing data defining historical pathways comprises retrieving data that has been preprogrammed at the handoff device.

19. The method of claim 10 wherein identifying a preferred path through the specific geographic area for the wireless communication device comprises selecting a path for the wireless communication device to maintain reliable communication over the wireless communication network between the handoff device and the wireless communication device from a current location of the wireless communication device to a handoff location in the specific geographic area where communication can be efficiently handed off from the handoff device to another handoff device of the wireless communication network.

20. A method comprising:

in an access point (AP) providing wireless communication to a wireless local area network (LAN),
establishing wireless communication between the AP and a wireless communication device in a specific geographic area which is served in part by the AP and the LAN;

determining communication characteristics of the LAN in the specific geographic area;

determining location information of the wireless communication device in the specific geographic area;

comparing the location information of the wireless communication device with the communication characteristics of the specific geographic area;

based on the comparison, identifying a preferred path through the specific geographic area for the wireless communication device, the preferred path selected to maintain reliable communication over the LAN between the AP and the wireless communication device from a current location of the wireless communication device to a handoff location in the specific geographic area where communication can be efficiently handed off from the AP to another AP of the LAN;

based on the comparison, identifying one or more other access points for handing off communication with the wireless communication device; and transmitting to the wireless communication device a set of navigation instructions based on the preferred path and the identified one or more other handoff devices, the set of navigation instructions defining an optimal path through the specific geographic area and the identified the identified one or more other handoff devices for subsequent handoff by the handoff device.

* * * * *